US009177267B2

(12) United States Patent
Kass et al.

(10) Patent No.: US 9,177,267 B2
(45) Date of Patent: Nov. 3, 2015

(54) EXTENDED COLLABORATION EVENT MONITORING SYSTEM

(75) Inventors: Alex Kass, Palo Alto, CA (US); Peter Zei-Chan Yeh, San Jose, CA (US); Jordan K. Buller, San Francisco, CA (US); Mary Elizabeth Hamilton, San Francisco, CA (US); Shaw-Yi Chaw, San Jose, CA (US)

(73) Assignee: Accenture Global Services Limited, Dublin (IE)

( * ) Notice: Subject to any disclaimer, the term of this patent is extended or adjusted under 35 U.S.C. 154(b) by 802 days.

(21) Appl. No.: 13/222,906

(22) Filed: Aug. 31, 2011

(65) Prior Publication Data

US 2013/0054509 A1 Feb. 28, 2013

(51) Int. Cl.

| | |
|---|---|
| ***G06F 17/00*** | (2006.01) |
| ***G06N 7/00*** | (2006.01) |
| ***G06N 7/08*** | (2006.01) |
| ***G06Q 10/00*** | (2012.01) |
| *G06N 5/02* | (2006.01) |

(52) U.S. Cl.

CPC . *G06Q 10/00* (2013.01); *G06N 5/02* (2013.01)

(58) Field of Classification Search

None

See application file for complete search history.

(56) References Cited

U.S. PATENT DOCUMENTS

| | | | | |
|---|---|---|---|---|
| 6,065,009 | A | 5/2000 | Leymann et al. | |
| 7,526,459 | B2 * | 4/2009 | Flinn et al. | 706/12 |
| 7,895,209 | B2 | 2/2011 | Spence et al. | |
| 8,145,678 | B2 | 3/2012 | Ramsay, Jr. et al. | |
| 8,301,477 | B2 | 10/2012 | Allam et al. | |
| 8,768,751 | B2 | 7/2014 | Jakowski et al. | |
| 8,768,764 | B1 | 7/2014 | Paharia | |
| 2002/0023176 | A1 | 2/2002 | Kwicinski | |
| 2002/0157017 | A1 * | 10/2002 | Mi et al. | 713/200 |
| 2003/0061330 | A1 | 3/2003 | Frisco et al. | 709/223 |
| 2003/0078874 | A1 | 4/2003 | Cope | |
| 2003/0090514 | A1 | 5/2003 | Cole et al. | |
| 2004/0143477 | A1 | 7/2004 | Wolff | |

(Continued)

FOREIGN PATENT DOCUMENTS

| | | |
|---|---|---|
| EP | 1 619 618 A1 | 1/2006 |
| EP | 1 699 009 A1 | 9/2006 |

OTHER PUBLICATIONS

Korba, Larry, et al. "Automated social network analysis for collaborative work." (2006).*

(Continued)

*Primary Examiner* — Kakali Chaki
*Assistant Examiner* — Daniel Pellett
(74) *Attorney, Agent, or Firm* — Brinks Gilson & Lione

(57) ABSTRACT

An extended collaboration event monitoring system monitors users' interactions with computer software applications and detects and extracts events. The system intelligently determines whether the extracted events trigger undetected events or other action items. The system provides the extracted events to a social networking client that translates the extracted events and returns the translated data to the system. The system publishes the translated data to a social networking/collaboration interface embedded into the interface of the computer software application being utilized by one of the users. The system not only publishes the translated data corresponding to a user's interactions with the computer software application to that user's interface, but also publishes the user's interactions with the computer software application to interfaces corresponding to other project team members as well.

23 Claims, 10 Drawing Sheets

(56) References Cited

U.S. PATENT DOCUMENTS

| | | | | |
|---|---|---|---|---|
| 2004/0183829 | A1* | 9/2004 | Kontny et al. | 345/751 |
| 2004/0186762 | A1 | 9/2004 | Beaven et al. | 705/8 |
| 2005/0027585 | A1 | 2/2005 | Wodtke et al. | 705/9 |
| 2005/0095569 | A1 | 5/2005 | Franklin | 434/350 |
| 2006/0195778 | A1 | 8/2006 | Bendik | |
| 2007/0100875 | A1 | 5/2007 | Chi et al. | |
| 2007/0124185 | A1 | 5/2007 | Elkin et al. | |
| 2007/0162324 | A1 | 7/2007 | Suzuki et al. | |
| 2007/0162907 | A1 | 7/2007 | Herlocker et al. | |
| 2007/0276714 | A1 | 11/2007 | Beringer | |
| 2008/0004927 | A1* | 1/2008 | Haller et al. | 705/7 |
| 2008/0091496 | A1 | 4/2008 | Gurpinar et al. | |
| 2008/0127041 | A1* | 5/2008 | Gura | 717/101 |
| 2008/0155425 | A1 | 6/2008 | Murthy et al. | |
| 2008/0183538 | A1 | 7/2008 | Hamadi et al. | |
| 2008/0228774 | A1* | 9/2008 | Hamilton et al. | 707/10 |
| 2008/0229213 | A1* | 9/2008 | Hamilton et al. | 715/751 |
| 2008/0229214 | A1* | 9/2008 | Hamilton et al. | 715/751 |
| 2008/0312992 | A1 | 12/2008 | Hoshi et al. | |
| 2009/0112655 | A1 | 4/2009 | Stuhec et al. | |
| 2009/0138257 | A1* | 5/2009 | Verma et al. | 704/9 |
| 2010/0057682 | A1 | 3/2010 | Ramsay et al. | |
| 2010/0121859 | A1 | 5/2010 | Maeda et al. | |
| 2010/0262557 | A1 | 10/2010 | Ferreira et al. | |
| 2011/0137702 | A1 | 6/2011 | Hodges et al. | |
| 2011/0179045 | A1 | 7/2011 | Caldwell et al. | |
| 2011/0288897 | A1 | 11/2011 | Erhart et al. | |
| 2012/0215705 | A1 | 8/2012 | Porro et al. | |
| 2012/0216125 | A1 | 8/2012 | Pierce | |
| 2013/0073280 | A1 | 3/2013 | O'Neil et al. | |
| 2013/0073343 | A1 | 3/2013 | Richardson et al. | |
| 2014/0025441 | A1 | 1/2014 | Eberlain et al. | |

OTHER PUBLICATIONS

Wellman, Barry. "Computer networks as social networks." Science 293.5537 (2001): 2031-2034.*

Fisher, Danyel, and Paul Dourish. "Social and temporal structures in everyday collaboration." Proceedings of the SIGCHI conference on Human factors in computing systems. ACM, 2004.*

Dutra, Moisés, et al. "Using an Inference Engine to Detect Conflicts in Collaborative Design." 14th International Conference on Concurrent Enterprising (ICE 2008)—Lisbon, Portugal. 2008.*

First Examiner's Report for Australian Application No. 2010206022 dated Mar. 30, 2011 (3p).

European Search Report for EP Application No. 11183845.4 dated Dec. 30, 2011 (7p).

Office Action for U.S. Appl. No. 12/537,830 dated Mar. 21, 2012 (15p).

Office Action for U.S. Appl. No. 12/537,830 dated Aug. 28, 2012 (16p).

Salesforce.com Unveils Salesforce Chatter—Enterprise Collaboration Meets the Real-Time Social Computing Model Loved by Millions on Facebook and Twitter—http://www.prnewswire.com/news-releases/salesforcecom-unveils-salesforcechatter—enterprise-collaboration-meets-the-real-time-social-computing-modelloved-by-millions-on-facebook-and-twitter-70374242.html, dated Jan. 22, 2013, (4p).

LeFebvre, Richard, "Online Media Daily: Oracle Takes Social Marketing Seriously", Oracle CRM EMA Partner Community, Nov. 19, 2012, (1p).

Oracle Social Network—An Oracle White Paper, Oct. 2011. http://www.oracle.com/technetwork/middleware/webcenter/socialnetwork/overvie w/wp-oracle-social-network-2011-513258.pdf, (18p).

Salesforce Radian6—Insights—Social Media is a Big Data—http://www.radian6.com/what-we-sell/marketingcloud/analysis-insights/, Jan. 22, 2013, (1p).

Salesforce Radian6—Engagement Console—Engagement Console, http://www.radian6.com/what-we-sell/marketingcloud/analysis-insights/, Jan. 22, 2013, (4p).

Salesforce Radian6—Workflow and Automation—http://www.radian6.com/whatwe-sell/marketingcloud/analysis-insights/, Jan. 22, 2013, (2p).

Social Ads—Amplify your content, Jan. 22, 2013, (1p).

Salesforce Social Hub—Transform Your Business into a Socially Connected Enterprise, Jan. 22, 2013, (2p).

Data Super Friends: Can Social Medial and Enterprise Applications Team Up?—http://webcachegoogleusercontent.com/search?q=cache:6OyJ4dxjL6YJ:http://gigaom . . . , dated Jan. 22, 2013, (8p).

OfficeXta-Social Enterprise Collaboration Platform—https://www.officexta.com/tag/features.do?p=1, dated Jan. 22, 2013, (2p).

SnapLogic—Social Media Integration: Cloud Data Integration Tools & Solutions—http://www.snaplogic.com/what-we-do/solutions/social-media-integration.php, dated Jan. 22, 2013, (1p).

SocialCast-Enterprise Social Networking, Enterprise Collaboration—http://www.socialcast.com/product, dated Jan. 22, 2013, (3p).

SocialCast-Integrat Business Applications with Enterprise Social—http://www.socialcast/com/social-network-integration, dated Jan. 22, 2013, (2p).

Social Cast-Enterprise Social Networking Software & Activity Stream—http://www.socialcast.com/enterprise-social-network, dated Jan. 22, 2013, (2p).

SAP Social Software—Video: Social Learning with SAP Jam and SuccessFactors Learning Management System by David Brockington (Dec. 12, 2012)—http://scn.sap.com/community/socialsoftware/blog, dated Jan. 22, 2013, (14p).

Social Media Analysis Software-CRM Software-SAP—Make Social Media Platforms an Asset to Your Organization With Our Social Media Analysis Software—http://www54.sap.com/lob/customer-service/software/socialmediaanalytics/index.html, dated Jan. 22, 2013, (1p).

Facebook for the Enterprise—http://www.appirio.com/products/facebookconnect.php, dated Jan. 22, 2013, (1p).

Appirio Helps Businesspeople Connect the Facebook Platform to Salesforce CRM—http://press.appirio.com/2008/10/appirio-helps-businesspeopleconnect.html, dated Jan. 22, 2013, (2p).

Yammer: What is Yammer—The First and Most Powerful Enterprise Social Network—https://www.yammer.com/product/, dated Jan. 22, 2013 (2p).

Yammer: Yammer Platform—What is Yammer—Integrate Your Business Applications—https://www.yammer.com/product/features/yammer-platform/, dated Jan. 22, 2013, (3p).

Gamification 101: An Introduction to the Use of Game Dynamics to Influence Behavior, White Paper BUNCHBALL Inc, Oct. 2010, retrieved online on Mar. 18, 2015 from http://bunchball.com/sites/default/files/downloads/gamification101.pdf, 14 pages.

* cited by examiner

Figure 4

EXTENDED COLLABORATION EVENT MONITORING SYSTEM

TECHNICAL FIELD

This application relates to electronic collaboration tools and applications. In particular, this application relates to embedding collaborative social networking components into electronic client applications.

BACKGROUND

Client applications, such as those used to perform management, consulting, collaborative, etc. services, often use a complex set of resources and personnel to serve a client's needs. The resources and personnel needed to meet a client's needs may vary throughout a particular business process. With today's business and technology requirements, creating a cost-effective collaboration infrastructure that effectively monitor's a project team's progress, collectively and individually, and that identifies and leverages a business' best personnel and resources for a given project can be challenging.

BRIEF DESCRIPTION OF THE DRAWINGS

The system may be better understood with reference to the following drawings and description. The elements in the figures are not necessarily to scale, emphasis instead being placed upon illustrating the principles of the type model. In the figures, like-referenced numerals designate corresponding features throughout the different views.

FIG. 4 shows an example of user-generated information published to a collaboration feed section side-by-side with automatically-generated events.

DETAILED DESCRIPTION

Figure 1:
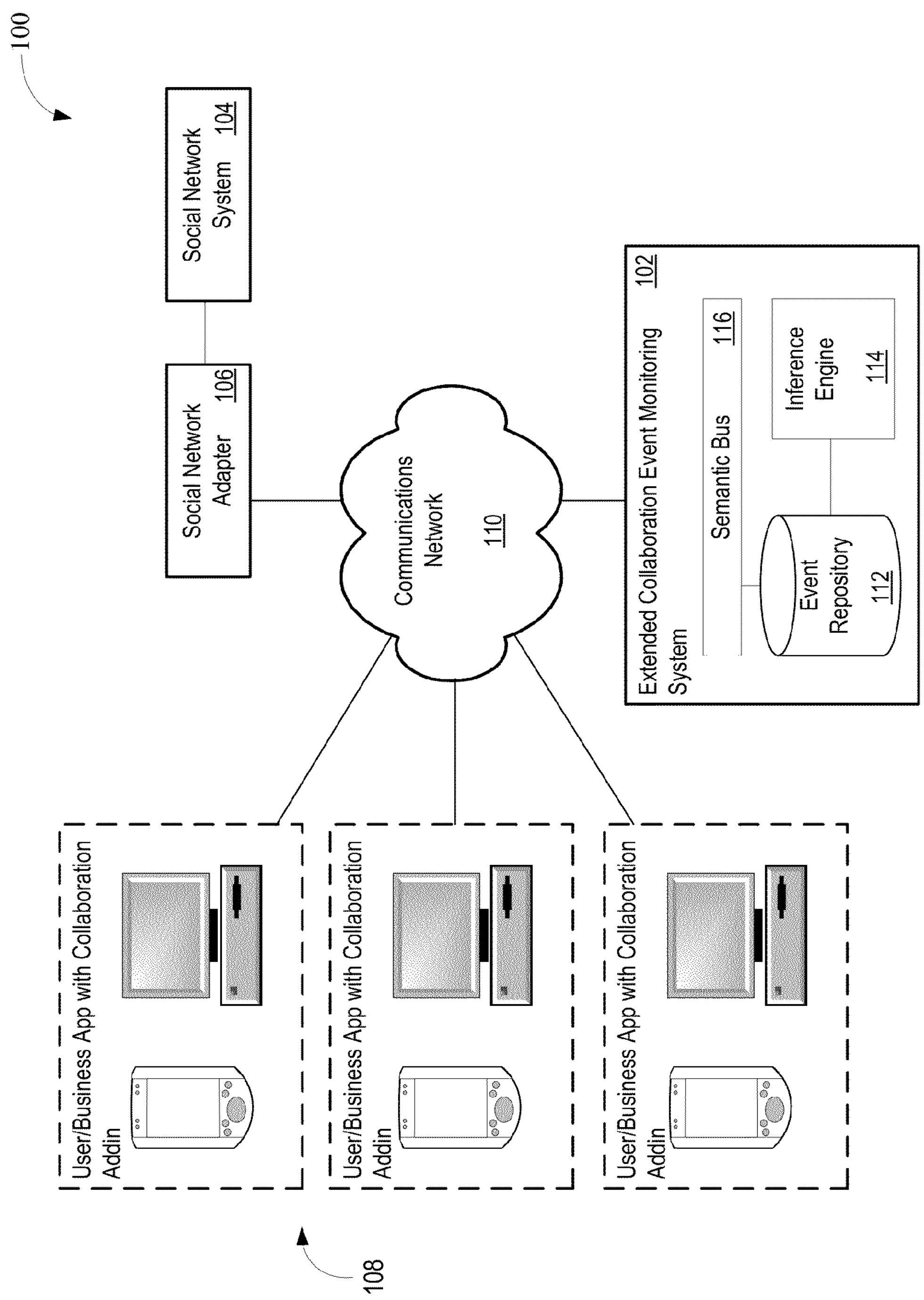
FIG. 1 shows an example of architecture for representing, monitoring, and routing events in collaborative processes.

FIG. 1 shows an example of architecture 100 for representing, monitoring, and routing events in collaborative processes. The architecture 100 includes an extended collaboration event monitoring system 102, a social network system 104, a social network adapter 106, and user portals 108, each of which is configured to communicate over a communications network 110. The user portals 108 may correspond to members of a project team or collaboration group using client applications, or other computer software applications, to perform a business process or plan. The computer software applications corresponding to the user portals 108 may be extended via a software addin to monitor a user's actions within the application and identify relevant events occurring within those client applications. As an example, the client application may be an office suite application, e.g., Microsoft Office®, WordPerfect Office®, etc., or other computer software applications.

The extended collaboration event monitoring system 102 is configured to monitor, via the software addin that extends the computer software application, a user's actions within the application and detect and extract relevant events. In the context of a word processing application, a relevant event may be the completion of a section of a document, the completion of the document itself, the mention of a relevant individual or key word, discussion of a step in a business process, or other events that may be relevant to a collaboration team. The collaboration addin that extend the computer software application identifies the extracted events, translating them into a structured, semantic representation.

Events may be identified in different ways.

The system 102 includes an event repository 112, which includes an event database. The system 102 also includes an inference engine 114 and a semantic bus 116. The various components of the system 102 may be stored in a memory and performed by a computer processor, or may be distributed over multiple memory structures and performed by multiple computer processors that are locally connected or connected across the communications network 110. For example, the semantic bus 116, event repository 112 and inference engine 114 may be stored and operated on different servers interconnected via the communications network 110. Further the event detection performed by the collaboration addin may be executed by a processor, such as the processor of the user portal 108 executing the computer software application, which is separate from the processor executing the event inference functionality.

The structured, semantic representation corresponding to an extracted event may be sent by the addin to the event repository 112. The event repository 112 accepts the event and stores it to the database. The event repository 112 sends the event to the inference engine 114 and to the semantic bus 116. The inference engine is an intelligent service, such as, for example, a software application, that is configured to take the event triggered by the client application and develop more advanced events. For example, the inference engine 114 may analyze the structured, semantic representation to infer additional information, such as events that were not explicitly detected or implied by the detected events, or events that may be enabled or triggered as a result of the detected event. For example, a document review event may be triggered or enabled by a document completion event.

The system 102 is driven by a set of models, or ontologies, which may be accessed by the addin to determine whether an event has occurred, as well as by the inference engine 114 to infer new events, or modify the detected events, based on the detected event. The models, or ontologies, may include people models, such as structure profiles; work product models, such as document templates; plan and process models; and domain specific models. The domain specific models may include, for example, a model that specifically applies to pharma or other industries or areas. These models may include a set of key words, experts, or other information relevant to the particular industry. The work product models may include information about documents to be used as part of the project. For example, the work product model may include information identifying how long a particular section of a document typically is. When a user completes work on a section of a document, the system may analyze the corresponding model to determine if the length of the section edited by the user exceeds the length identified in the model. If so, the system may determine that the user has completed work on that section and publish a corresponding event to the feed.

The plan and process models may include information about a business process or plan, and may be used to determine, for example, when a particular detected event triggers a non-detected event or to-be-performed task. The information contained in plan and process models may include the steps of a process or plan and where different events fall within those processes or plans, as well as the individuals, documents and other resources relevant to various steps of the process or plan. The people profiles may include information about the various people involved in a process or plan, in an industry, on a project team or collaboration group, or about people involved in other related groups. The information may include location and contact information, including phone and fax numbers, physical address, instant messaging identification, email address, etc. The information may also include a person's experience or level expertise in various fields related to a process, plan, or industry.

The system 102 interfaces with the social networking system 104 through the social network adapter 106 to embed a collaboration interface into the client applications used in the collaborative process. For example, the system 102 may proactively access content within a particular client application to facilitate, and automate, the creation of collaborative alerts and messages embedded into the client application. The system 102 may include the semantic bus 116 that communicates messages and events between the system 102 and the social network adapter 106 and social network system 104.

The social networking system 104 may be Jive®, Tibbr®, Moxie®, Chatter®, Yammer®, Newsgator® or other social network/micro-blogging systems. The social network adapter 106 translates the event information received from the extended collaboration event monitoring system 102 into information usable by the social networking system 104. The social networking system 104 generates updates based on the received event information and pushes the updates back to the system 102 through the adapter 106. When the system 102 receives updates, it populates a collaboration interface embedded into the client application with the update information. The system 102 may populate collaboration interfaces corresponding to multiple users based on one triggered event. For example, if a user completes a task or edits a document, the system 102 may send updates to the collaboration interfaces of other users that are part of the user's project team or collaboration group.

The system 102 may communicate with the social network adapter 106 and social networking system 104 through a communications network 110. The communications network 110 may be any private or public communications network or combination of networks. The communications network 110 may be configured to couple one computing device, such as a server, system, database, or other network enabled device, to another device to enable communication of data between computing devices. The communications network 110 may generally be enabled to employ any form of computer-readable media for communicating information from one computing device to another. The communications network 110 may include one or more of a wireless network, a wired network, a local area network (LAN), a wide area network (WAN), a direct connection such as through a Universal Serial Bus (USB) port, and the like, and may include the set of interconnected networks that make up the Internet. The communications network 110 may include any communication method by which information may travel between computing devices.

The user portals 108 may access the process-enabled collaborative portal via the communications network 110 using a standard browser application. A browser based implementation allows system features to be accessible regardless of the underlying platform of the user portals 108. For example, the user portals 108 may each be a desktop, laptop, handheld computer, cell phone, mobile messaging device, network enabled television, digital video recorder, automobile, or other network enabled user portal, which may use a variety of hardware and/or software packages. The user portals 108 may connect to the process-enabled collaborative portal using a stand-alone application which may be platform-dependent or platform-independent. Other methods may be used to implement the user portals 108.

Figure 2:
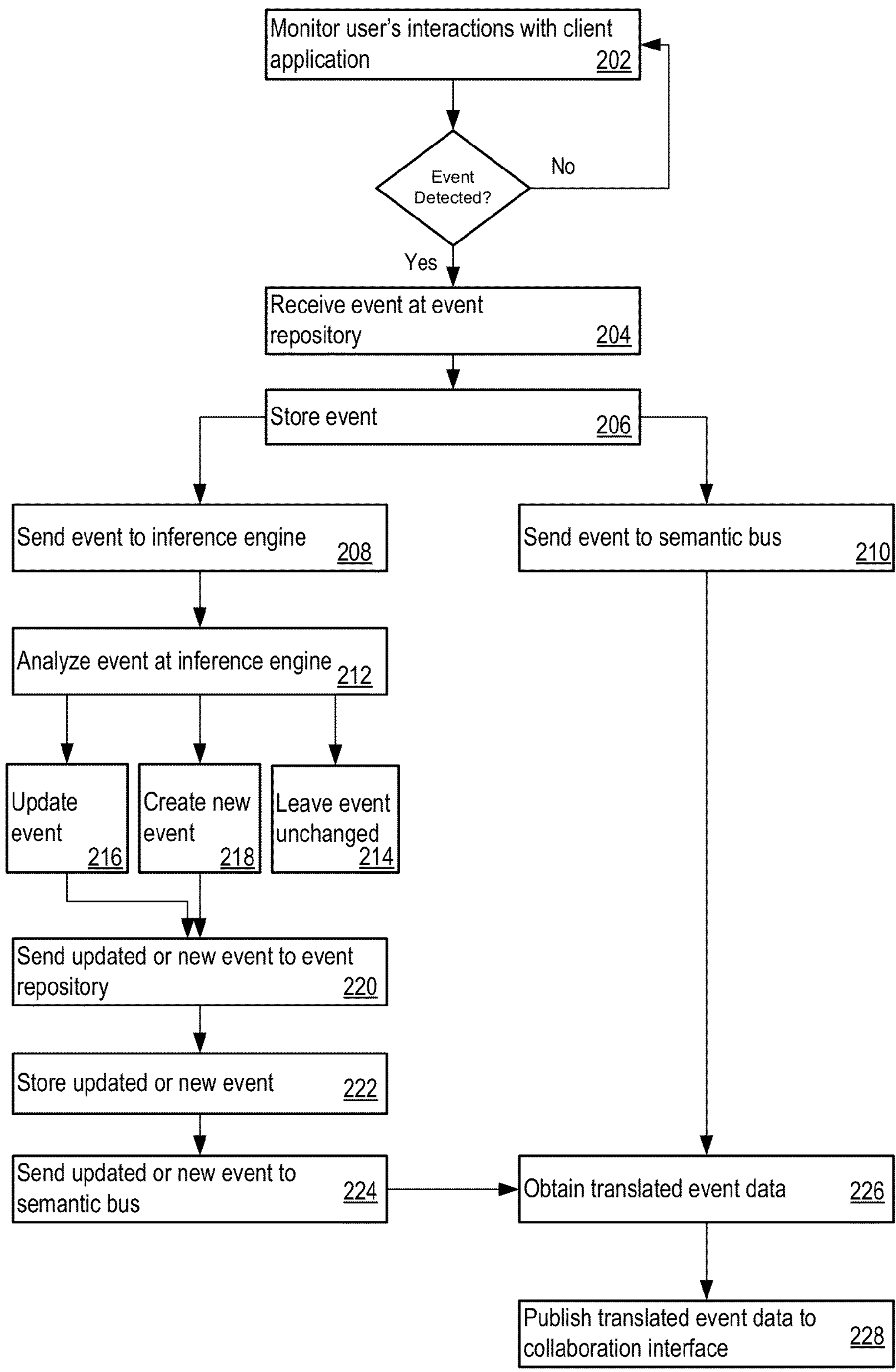
FIG. 2 shows an example of a process by which an extended collaboration event monitoring system identifies and extracts events and published events to a collaboration interface embedded into a computer software application.

FIG. 2 shows an example of a process 200 by which an extended collaboration event monitoring system, such as the system 102, identifies and extracts events and published events to a collaboration interface embedded into a computer software application. The system 102 monitors a user's interactions with a computer software application, such as a client application, for an event performed by the user (Block 202). The system 102 may include a software addin that monitor's the user's actions. The user may be a member of a project team or collaboration group, the members of which may be located remotely relative to each other and may be using different applications at any given time. An event may be an act taken by the user in the application, such as completing a document or a section of a document, completing review of a document, mentioning a relevant keyword or individual in a document, or other events that may be relevant to the other members of the project team or collaboration group.

Event detection may be key word based. For example, a domain specific model may include a set of key words, the identification of which is identified as an event. Event detection may also be accomplished by parsing the text edited or added by a user. For example, a natural language parser may first be applied to the text to generate a parse tree or syntactic representation of the text. The elements of this parse tree or syntactic representation (e.g. nouns, verbs, case roles, etc.) may then be mapped to the corresponding semantic concepts and relationships in the semantic models. This mapping can be performed using various configurations of technologies such as semantic matching, word sense disambiguation, semantic role labeling, etc.

Event detection may also be accomplished by monitoring for predefined heuristics, stored in the models, such as user actions like creating a new section heading (which can be a heuristic for starting a new section) or a section reaching a predefined number of words (which can be a heuristic for completing a section). As another example, characteristics of text entered by the user into a document may be a heuristic indicating an event. In this example, if the user enters text that is bold or underlined and has a font size greater than 12 point font, the work product model, or ontology, may indicate that the user has created a section heading and thus, that the user has created a new section in the document. The heuristics may be rules that indicate whether a user's actions constitute an event. The above tree event detection methods may all be supported via semantic models of the events of interest from the ontologies.

Event detection may also be user-prompted. For example, when a user saves a document, the system 112 may generate a pop-up to the collaboration interface asking the user whether a section of the document, or the document itself, was completed.

When an event is detected, the system 102 receives event data corresponding to the detected event via a web service call from the application addin (Block 204). In particular, the event data may be passed to the event repository 112 component of the system 102. The event data may include an advanced structure that identifies the type of action taken by the user, identifies the user that performed the event, and what documents and/or projects are associated with the event. Table 1 shows an example of the structure characterizing event data passed over the web service call to the system 102.

TABLE 1

```
"event":{
    "comment":"
    "section":"Testing Variables",
    "created_at":"2011-06-28T22:40:51Z",
    "actor":"Jordan Buller",
    "updated_at":"2011-06-28T22:40:51Z",
    "action":"",
    "document":"Oligonucleotide Delivery for Alzheimer's Treatments",
    "id":"9y7fd",
    "issue":"",
    "task":"",
    "event_type":1
  }
```

The system 102, or more particularly the event repository 112, stores the received event data to an event database (Block 206). The event repository 112 may associate the event data to other related data objects in the database, including database objects associated with the identified user, document and project. The event repository 112 sends the event data to the inference engine 114 (Block 208) and the semantic bus 116 (Block 210).

The system 102, or more particularly the inference engine 114, analyzes the event data based on the models or other contextual information. (Block 212). The models may include, as described above, people models, domain specific models, process and plan models, and work product models. If, for example, the event is a document completion event, the inference engine 114 may determine based on an analysis of a process and plan model—a model corresponding to the particular business process or plan being performed by the user or collaboration team—that the document completion event triggers a document review event. The inference engine 114 may further determine from the process and plan model, or from the people model, that a particular person is tasked with performing the document review event.

As another example, the inference engine may analyze the document modified by the user to determine if a defined business process is being discussed. The inference engine may determine that the business process was being discussed even without being explicitly mentioned, such as by identifying key words mentioned in the document that indicate that the business process is being discussed or by detecting events that are either sub-steps within the overall business process or that cause/enable the business process. These relationships (e.g. sub-steps, causes, enables, etc.) between the explicitly mentioned events and the implicit business process may be provided by a semantic model of the business process within the ontology. The inference engine may also create a new event based on the received event data. If the inference engine creates a new event, the inference engine sends the newly created event to the event repository and the semantic bus.

After receiving event data and analyzing the event data, the inference engine determines what action to take based on the event data. The inference engine may decide to take no action (Block 214), such as if no additional information was available about the detected event. The inference engine may decide to update the event data (Block 216). As noted above, the inference engine may also decide to create a new event (Block 218). These decisions are driven by the semantic models from the ontology, which may provide rules regarding what actions to take based on the event data. The inference engine 114 sends the new or updated event data to the event repository 112 (Block 220), and the event repository 112 stores the new or updated event data to the database (Block 222). The event repository 112 then passes the new or updated event data to the semantic bus 116 (Block 224).

A number of listening services may be in communication with the semantic bus 116. Some of these services may take the event data and create new event data, such as by creating an "expert recommendation" based on a "topic mention" event. For example, if the detected event is the mention of a particular topic in a document, one of the above-mentioned listening services may identify an expert on that topic and create an event recommending the expert to the project team. Other listening services may use the event data to build out enhanced profiles for users or create enhanced indexes of the documents being used. The semantic bus 116 makes the event data available to the semantic services, which continuously poll the stream of events passing through the semantic bus 116. If any event relevant to that listening service is detected on the semantic bus 116, the service pulls the event—which is still in the structured format, an example of which is shown in Table 1—and modifies, extends or otherwise takes action as necessary.

One of the listening services is a social network adapter 106. The social network adapter 106 polls all events on the semantic bus 116, and pulls relevant events. The adapter 106 converts the event data from the structure—an example of which is shown in Table 1—into a format that is user-readable, but also contains an identification of the event, such as an Event ID, so that the event properties may be recalled at a later time and/or by other components. For example, the structure shown in Table 1 may be translated into the following:

"John.Doe completed the Testing Variables Section of the document Oligonucleotide Delivery for Alzheimer's Treatments. <9y7fd>"

The social network system 104 pushes updates as they are created to the extended client application. The system 102 receives the translated event data (Block 226) and publishes the data to the collaboration interface embedded into the application corresponding to the users of the corresponding project team or collaboration group (Block 228). In the above example, the update would come from John Doe completion of the Testing Variables Section of the above-identified document, and, after being processed by the social network adapter 106, would be sent to all members of the "Alzheimer's Treatments Delivery Mechanisms" group.

The disclosed methods, processes, programs, and/or instructions may be encoded in a signal-bearing medium, a computer-readable medium such as a memory, programmed within a device such as on one or more integrated circuits, or processed by a controller or a computer processor. If the methods are performed by software, the software may reside in a memory resident to or interfaced to a communication interface, or any other type of non-volatile or volatile memory. The memory may include an ordered listing of executable instructions for implementing logical functions. A logical function may be implemented through digital circuitry, through source code, through analog circuitry, or through an analog source such as that occurring through an analog electrical, audio, or video signal. The software may be embodied in any computer-readable or signal-bearing medium, for use by, or in connection with, an instruction executable system, apparatus, or device. Such a system may include a computer-based system, a processor-containing system, or another system that may selectively fetch instructions from an instruction executable system, apparatus, or device that may also execute instructions.

Figure 3:
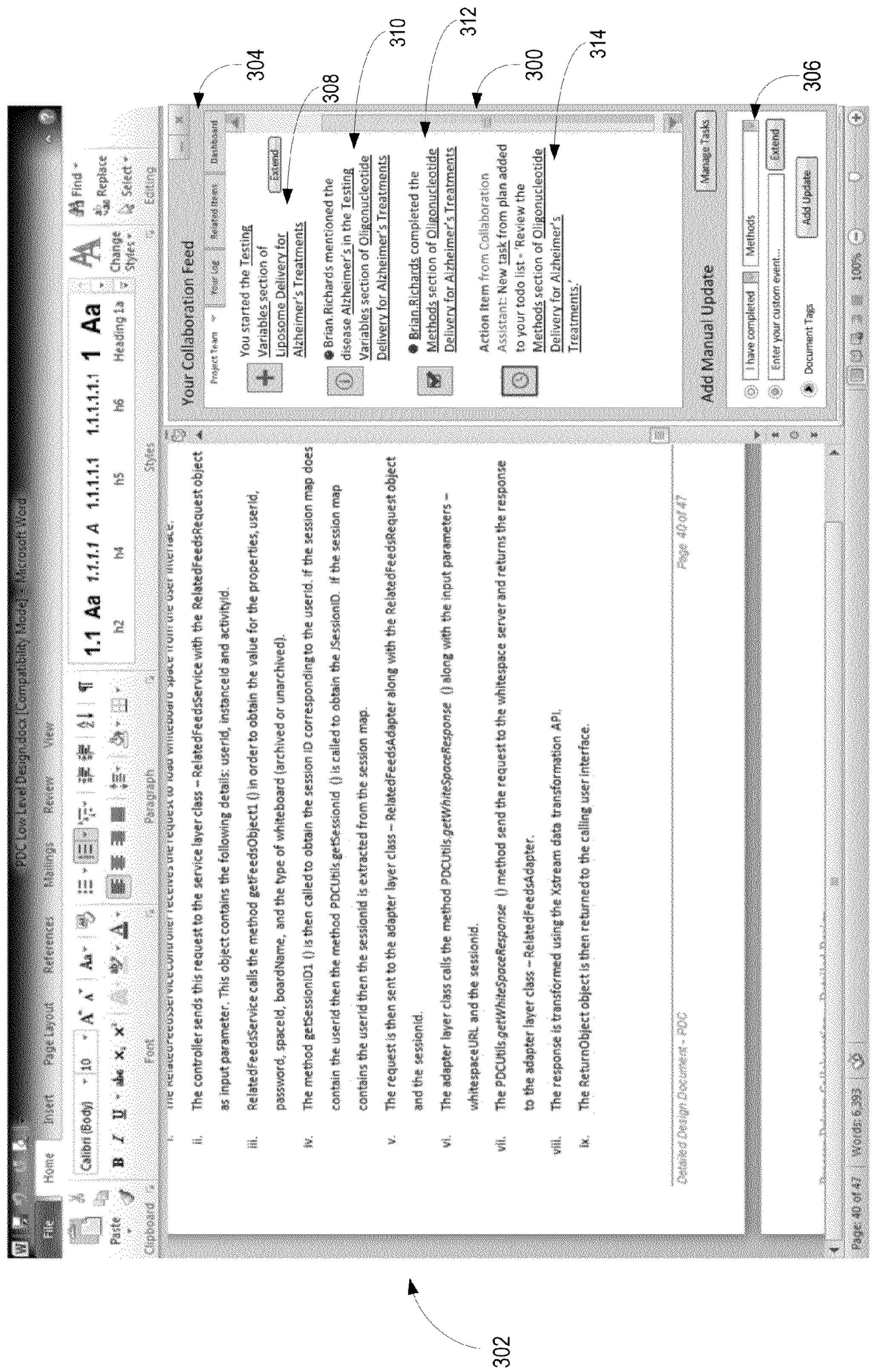
FIG. 3 shows an example of a collaboration interface embedded into a word processing application interface.

FIGS. 3-9 show examples of a collaboration interface 300 embedded into a client application interface 302. In particular, FIG. 3 shows an example of a collaboration interface 300 embedded into a word processing application interface, i.e., into a Microsoft Word® interface. For the sake of explanation, the client application is described in the context of a word processing application. It will be appreciated, however, that the extended collaboration event monitoring system described herein may be used to embed the collaboration interface 300 into other client applications. Further, it will be understood that different members of a project team or collaboration group may use different client applications at any given time. The updates are sent to each member of the project team or collaboration group member's interface, regardless of the application used by the team member that triggered the event.

The collaboration interface 300 includes a collaboration feed section 304 and a manual update section 306. Through the collaboration feed section 304 the system 102 notifies the user of the relevant events, including events triggered by the user and by other members of the user's project or collaboration team. For example, the system 102 may provide a notification 308 to the user and to other team members when he or she begins a particular section of a document. The system 102 may also provide a notification 310 when another team member mentions a key word in a document, or a notification 312 when another team member completes a section of a document. The system 102 may also provide action items 314 triggered by an event. For example, in FIG. 2 the action item 314 is triggered by the event 212. The notifications 308-314 include links, indicated by the underlined portion, to the corresponding document or section of the corresponding document, to the user profile of the user that triggered the event, to documents or sections of documents that mention a particular keyword, to task lists, and to other relevant information.

The manual update section 306 allows the user to enter manual updates. The manual updates will then be populated to the collaboration interface 300 and to the collaboration interfaces of the rest of the project team.

In this manner, the extended collaboration event monitoring system 102 provides team members with a meaningful log of each other's activities to help improve awareness and coordination. The system 102 not only notifies team members of which files each other is working with, but provides a more fine-grained awareness of what they are doing within the file, what topics and entities they are discussing or focusing on, and other relevant information.

As described above, the system 102 detects and extracts relevant events, and automatically updates the user's collaboration interface 300 with the relevant events. The system 102 augments the awareness of team members of key concepts being referenced.

Figure 4:
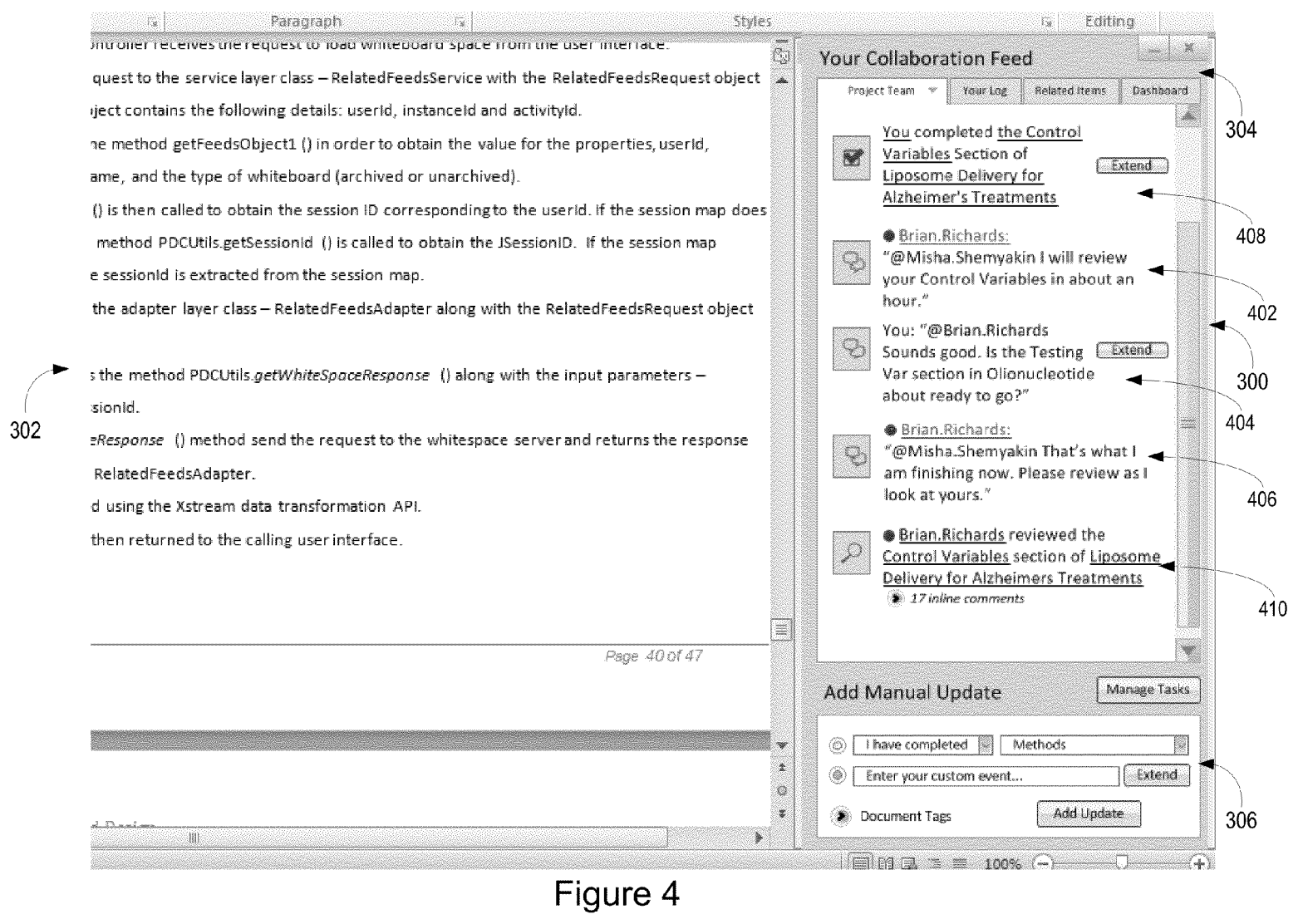

FIG. 4 shows an example of user-generated information 402, 404, 406 published to the collaboration feed section 304 side-by-side with automatically-generated events 408, 410. The information 402, 404, 406 are comments made by various collaboration group members. In this example, the comments are directed from one collaboration group member to another, but it will be understood that general comments directed from a collaboration group member to the collaboration group as a whole may also be published to the collaboration feed section 304. User-generated information published to the collaboration feed section 304 may also include user-created events.

Figure 5:
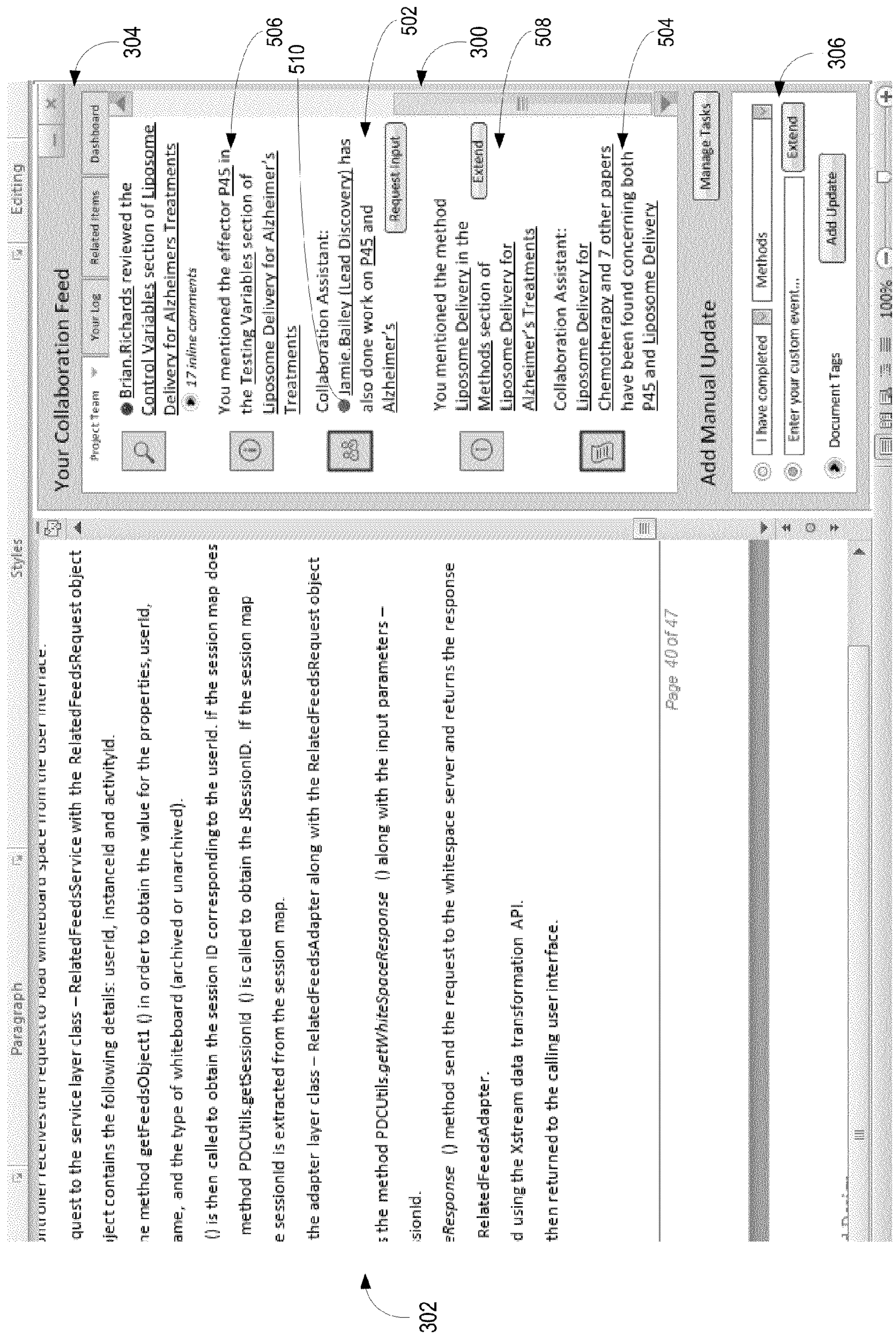
FIG. 5 shows an example of a collaboration feed with an "expert recommendation" event 502 a "document identification" event.

FIG. 5 shows the collaboration feed 304 with an "expert recommendation" event 502 a "document identification" event 504. As discussed above, the extended collaboration event monitoring system may identify experts or documents relevant to mentioned topics. The "expert recommendation" event 502 and "document identification" event 504 are examples of new events created by the inference engine of an extended collaboration event monitoring system. In this example, the "expert recommendation" event 502 was triggered by the event 506 in which the key word P45 was mentioned in a document. The system, based on, for example, a people model, identifies the relevant expert and adds the recommendation event. In addition, in this example the "document recommendation" event 504 was triggered by the event 508 in which the key word "Liposome Delivery" was mentioned in a document. The "document recommendation" event 504 may include an identification of, and links to, the relevant documents. The "expert recommendation" event 502 may include a presence indicator 510 indicating whether the expert is available. The "expert recommendation" event 502 includes links to the expert that enable the user to contact the expert via a call, chat, email or other method without having to leave the application.

Figure 6:
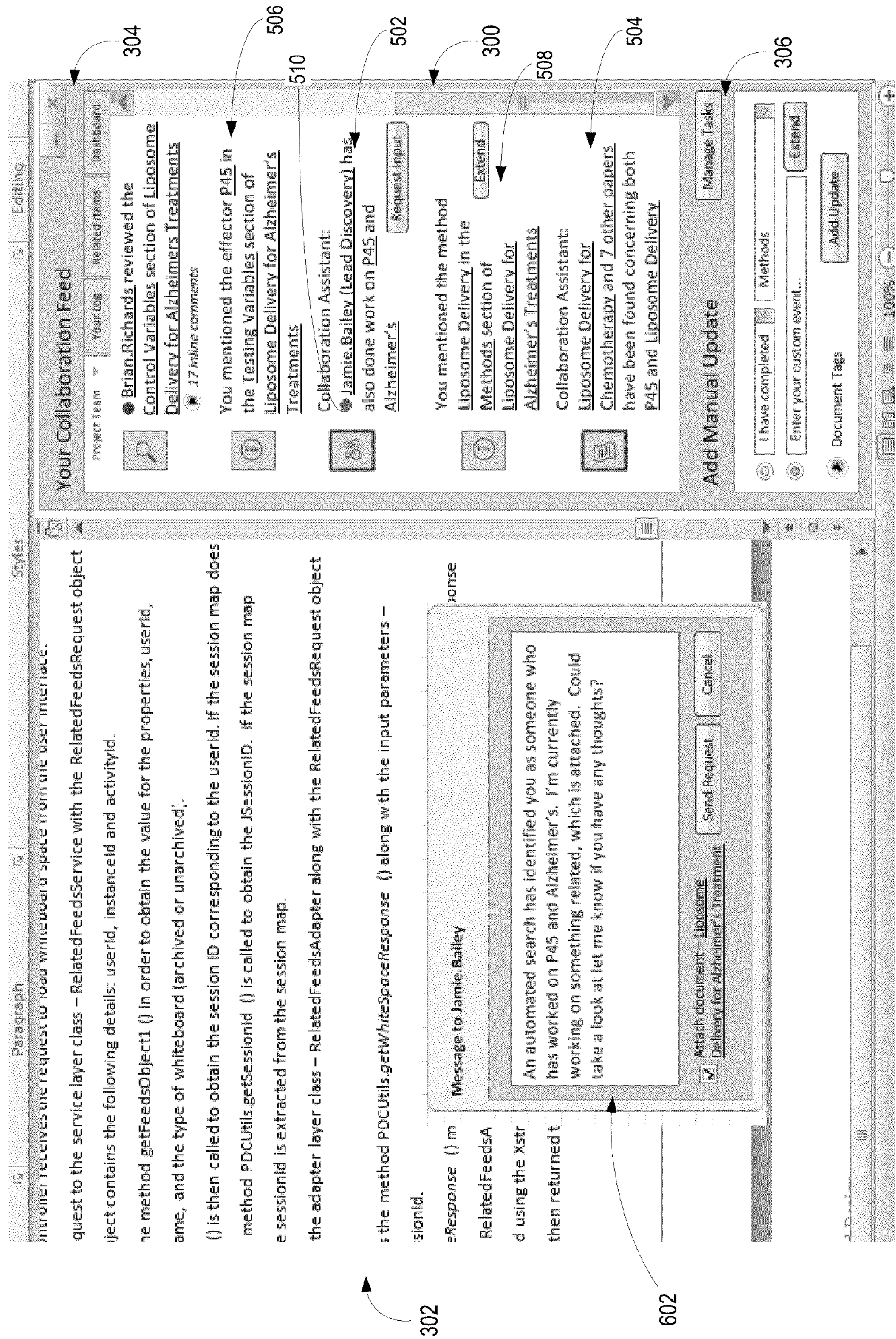
FIG. 6 shows an example of a pop-up dialog box populated with a message for connecting with an expert.

FIG. 6, for example, shows that upon clicking on the name of an expert, the extended collaboration event monitoring system causes to be displayed a dialog box 602 populated with a message for connecting with the expert. The user can send the expert details on what document he or she is working on and what related topics bring the expert to the user's attention, as well as the user's specific request for assistance.

Figure 7:
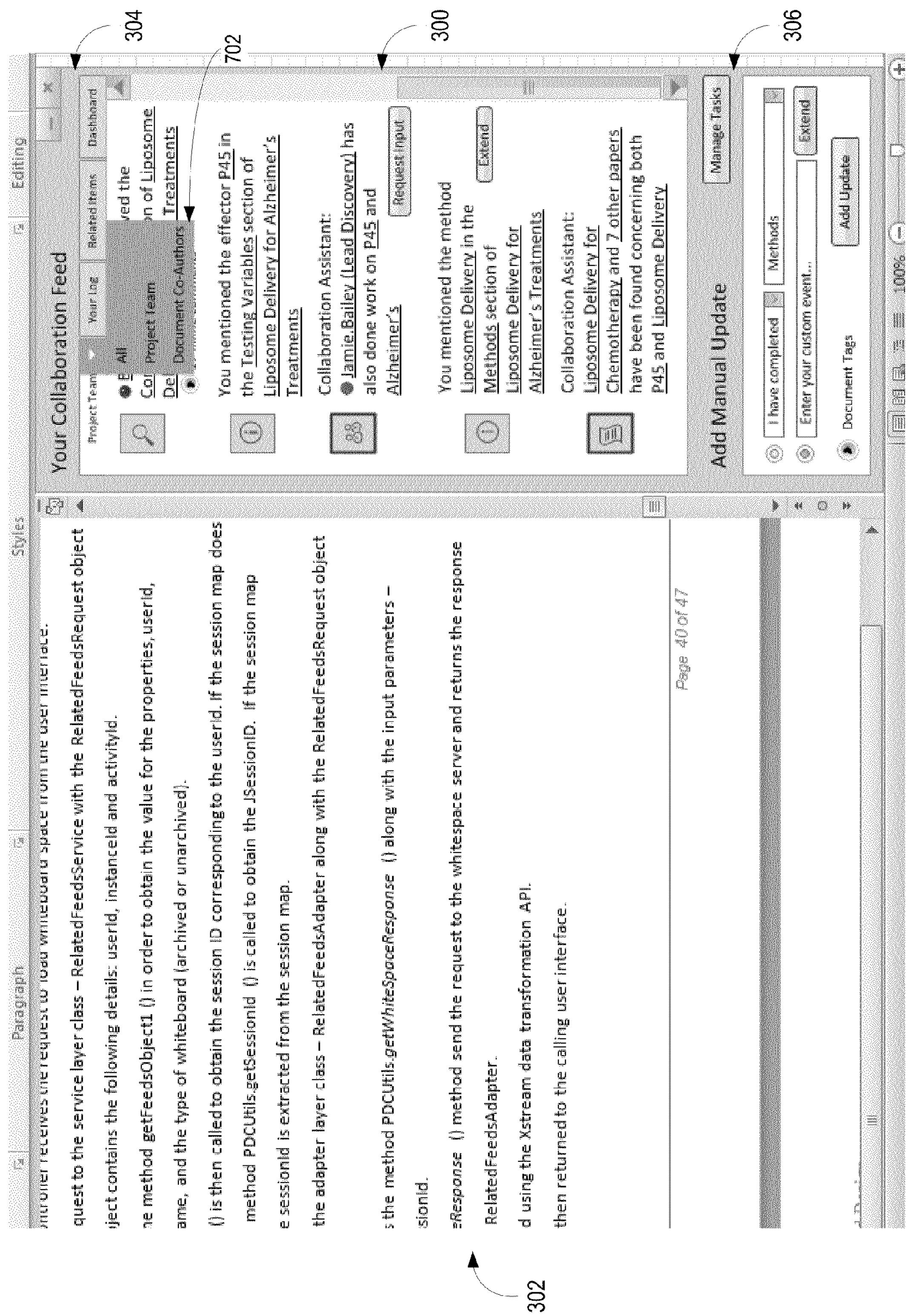
FIG. 7 shows that the event stream may be viewed under several different configurations.

FIG. 7 shows that the event stream may be viewed under several different configurations: All, Project Team, or Document Co-Authors. The collaboration feed 206 may include a drop down 702 that allows the user to select between the different views. The "All" view allows the user to see events from, or about, everyone the user identifies as a colleague, analogous, for example, to a Facebook® newsfeed. The "Project Team" view allows the user to see only events from or about the user's project and project team. The "Document Co-Authors" view allows the user to see a subset of the streamed data that is related, for example, to the specific document or work product the user current has open.

Figure 8:
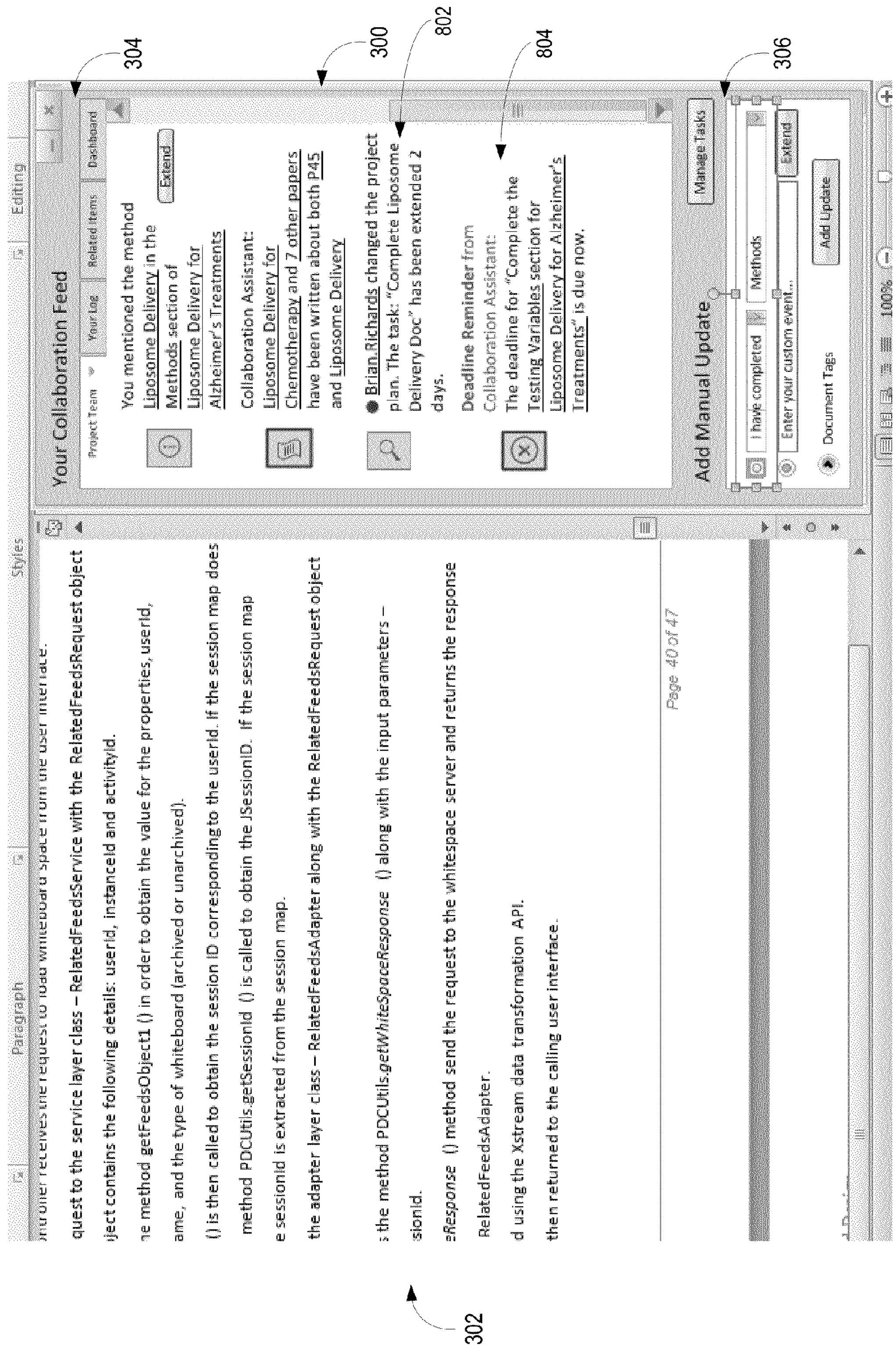
FIG. 8 an example of a collaboration interface including a "plan change" event.

In FIG. 8 the collaboration feed 304 includes a "plan change" event. As discussed above, the system is driven by a set of models, including a model of a project plan. If the plan is changed, the system will publish a "plan change" event 802 to the interfaces of each member of the project team. A model of a project plan may include milestones, steps in the process, lists of tasks, and other information that maps out for the project team how to complete the project. As events are detected, the system may determine how the event fits into the overall plan and publish relevant plan information to the feed. For example, the extended collaboration event monitoring system may publish a deadline notification event 804 to the collaboration interface 302 that notifies the team when a milestone has been reached, or if a milestone deadline is approaching. The extended collaboration event monitoring system may also generate and publish to the collaboration feed 304 events suggesting redistribution of project tasks. The system may compare each user's progress against a project template and suggest, via the collaboration feed 304, rebalancing the task load if, for example, one project team member is ahead and another is behind on their work. The system may also consider the project team members' respective qualifications and experience, including information provided by the people models, in assessing possible load rebalancing.

Figure 9A:
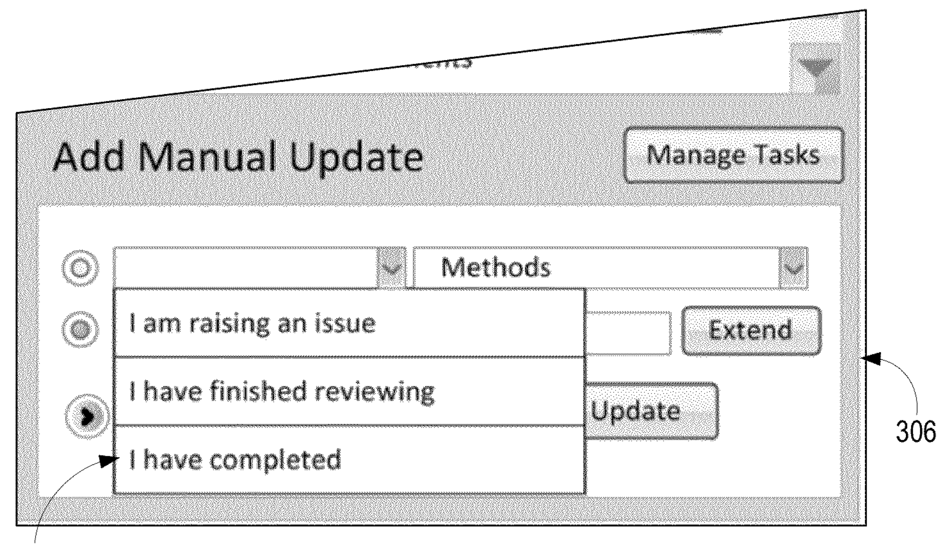
FIGS. 9*a*-9*b* show an example of a manual update section of a collaboration interface.
Figure 9B:
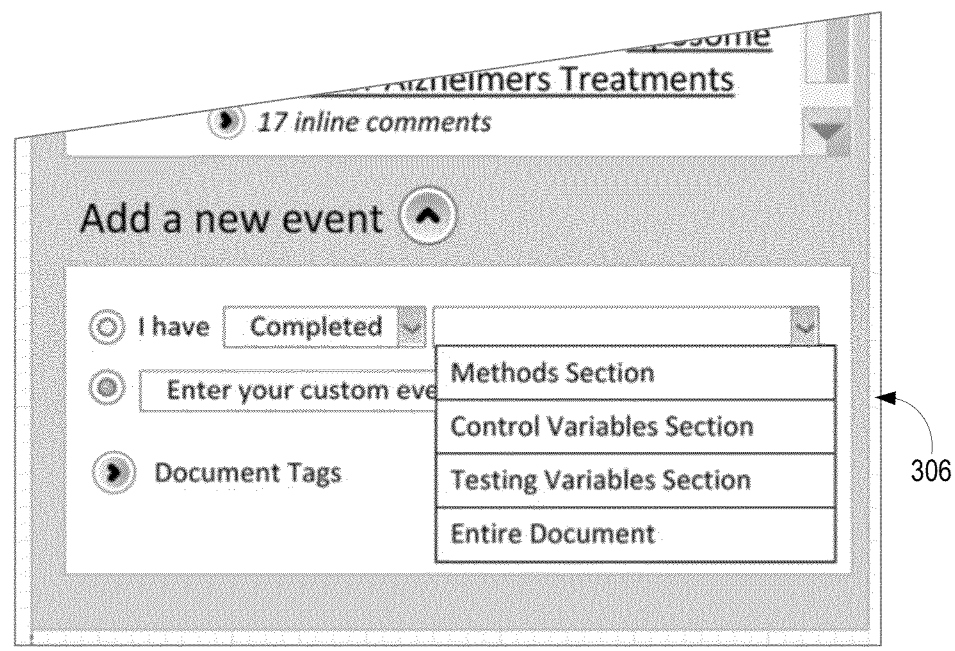

FIGS. 9*a*-9*b* show the manual update section 306 of the collaboration interface 302. Based on intelligent templates, the extended collaboration event monitoring system can identify what sections are included in a document and track the user as he/she moves and edits different parts of the document. Further, based on the action a user has taken in editing or reviewing a document, the extended collaboration event monitoring system can estimate which section has been edited and predict whether the user has completed the section. The manual update section 306 also guides users, via a user action input 902 and a document action input 904, in creating structured events that indicate when the user has completed, has reviewed, or has an issue with a document, section of a document, or other work. Via the user action input 902, the user may manually indicate an action he/she has taken. Via the document action input 904, the user may manually indicate on which document, or one which section of a document, the action was taken.

Figure 10:
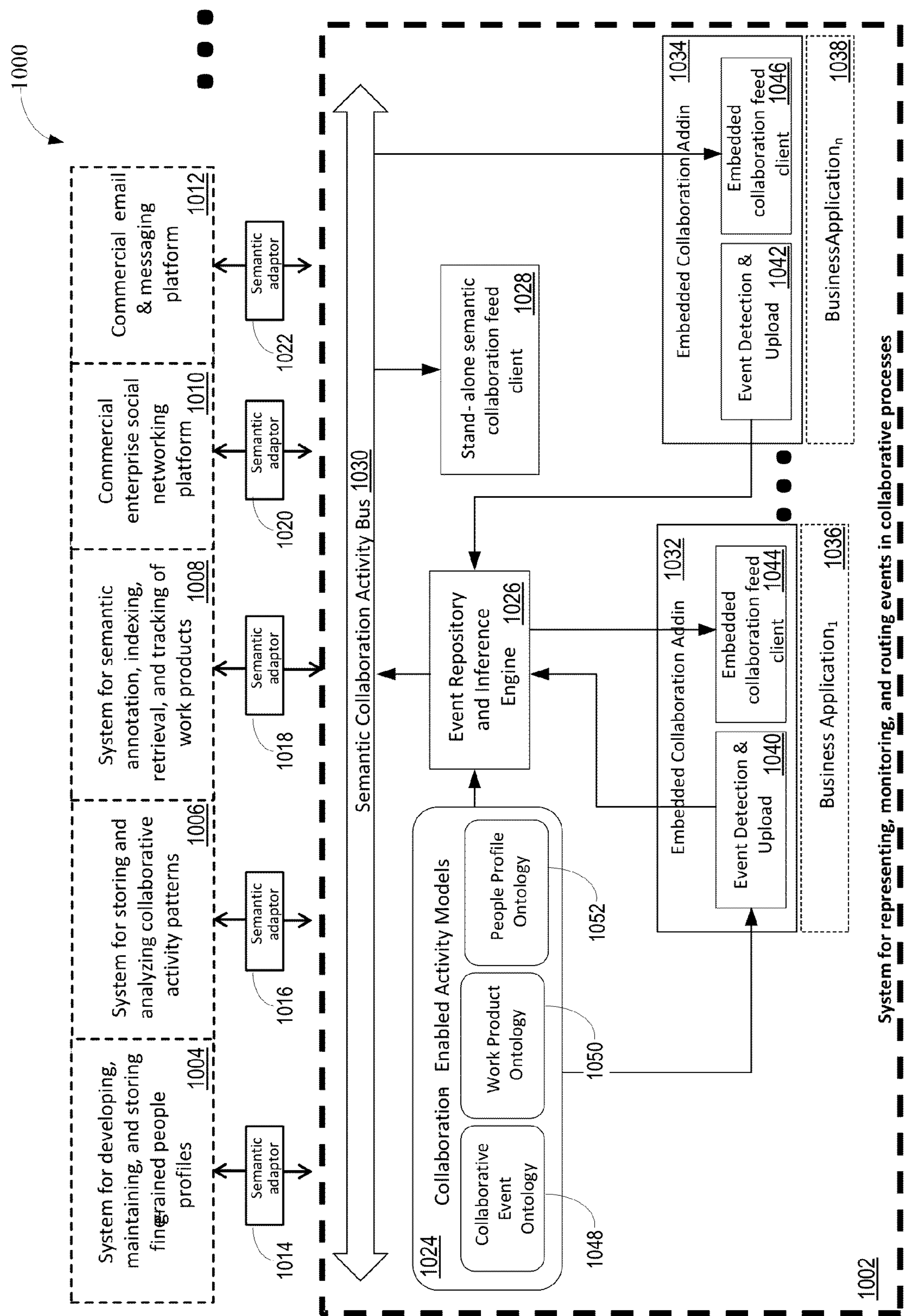
FIG. 10 shows an example of architecture for representing, monitoring, and routing events in collaborative processes.

FIG. 10 shows another exemplary architecture for representing, monitoring, and routing events in collaborative processes. The architecture 1000 includes an extended collaboration event monitoring system 1002, listening devices 1004, 1006, 1008, 1010, 1012, and semantic adaptors 1014, 1016, 1018, 1020, 1022 corresponding to the listening devices 1004, 1006, 1008, 1010, 1012, respectively. The listening device 1010 corresponds to a social networking platform or system, and the semantic adapter 1020 facilitates the translation of event data between the listening device 1010 and the system 1002.

The system 1002 includes collaboration-enabled activity models 1024, the event repository and inference engine 1026, a stand-alone semantic collaboration feed client 1028, and a semantic collaboration activity bus 1030. The system 1002 also includes embedded collaboration addins 1032, 1034 corresponding to business applications 1036, 1038, respectively. The collaboration addins 1032, 1034 include event detection components 1040, 1042, respectively, and embedded collaboration feed client components, 1044, 1046, respectively. The models 1024 may include collaborative event ontology models 1048, work product ontology models 1050 and people profile ontology models 1052.

The event detection components 1040, 1042 may be computer programs configured to monitor a user's interactions with the business applications 1036, 1038, respectively, and detect one or more events based on those interactions. The event detection components 1040, 1042 may access and analyze one or more of the models 1024 to identify an event based on the user's interactions. Detected events, which may be represented as shown above in Table 1, are sent to the event repository and inference engine 1026. The event repository stores the events to a database and sends the events to the semantic bus 1030 and inference engine. The inference engine analyzes the event and the models 1024 to determine whether to update the event, create a new event, or leave the event alone. Updated or new events are sent back to the event repository, stored in the database, and sent to the semantic bus 1030.

Semantic adapters 1014, 1016, 1018, 1020, 1022 access events placed or stored on the semantic bus 1030, and translate the events for use by the listening devices 1004, 1006, 1008, 1010, 1012, respectively. The semantic adapter 1020, for example, translates events placed on the semantic bus 1030 for use by a social network system (listening device 1010). The social network system translates the event into a user readable form that may be populated to the collaboration feed clients 1044, 1046 embedded into the user interfaces of the business applications 1036, 1038, respectively. The translated event is sent to the semantic bus 1030. The event repository passes the translated event to the addins 1032, 1034, which then populate the event to the collaboration feed clients 1044, 1046, respectively. The system 1002 may also include a template repository, e.g., stored in a memory, that includes a set of templates relevant to a business process or project, such as templates for documents used during a business process or project. The event detection component 1040 and/or 1042 may access and refer to a template corresponding to a document one or more users have opened and are working on in the business application 1036 and/or 1038. The work product ontology model 1050 may include heuristic information, for example, about each template. The event detection component 1040 and/or 1042 may use the heuristic information, in the context of the relevant template, to determine whether the user's interactions with the business application, and in particular, with the document, triggered an event.

It will be understood that events detected by the event detection component 1040 or the event detection component 1042 may be passed to the social network system and returned from the social network in a translated form, and may be populated to multiple collaboration feed clients.

The various components of the system 1002 may be stored in a memory and performed by a computer processor, or may be distributed over multiple memory structures and performed by multiple computer processors that are locally connected or connected across a communications network, such as the communications network 110. For example, the semantic bus 1030, event repository and inference engine 1026, collaboration enabled activity models 1024, and/or embedded collaboration addins 1032, 1034 may be stored and operated on different servers interconnected via the communications network.

As shown in FIGS. 3-9, the system 1002 embeds the collaboration feed client 1044 or 1046 directly into the user interface of the business application 1046 or 1038, respectively. Through the collaboration feed client 1044 or 1046 the system 1002 provides members of collaboration team prompt and organized information relevant to their project and its progress. In so doing, the system 1002 provides an improved user interface for users that organizes and presents information from multiple sources and databases into a single, efficient interface.

For example, events populated to the collaboration feed client 1044 or 1046 related to the completion of a document, or a section of a document, may include links to that document or section of the document. Events determined to involve a particular expert may include links or options that, when clicked or selected, automatically contact the expert via email, telephone, instant messaging, or other by communications means. In this manner the system 1002, makes efficient use of, and decreases the demand on, available computing resources, as well as decreases the computing time—and thus, again, decreases the computing resources—required to gather and provide a user with the relevant information.

While exemplary aspects, features, and components of a collaboration event monitoring system are described above, the system may be implemented in many different ways. For example, although some features may be shown or described as stored in computer-readable memories (e.g., as logic implemented as computer-executable instructions or as data structures in memory), all or part of the system and its logic and data structures may be stored on, distributed across, or read from other machine-readable media. The media may include hard disks, floppy disks, CD-ROMs, a signal, such as a signal received from a network or received over multiple packets communicated across the network.

The system may be implemented with additional, different, or fewer components. As one example, a processor may be implemented as a microprocessor, a microcontroller, a DSP, an application specific integrated circuit (ASIC), discrete logic, or a combination of other types of circuits or logic. As another example, memories may be DRAM, SRAM, Flash or any other type of memory. The processing capability of the system may be distributed among multiple components, such as among multiple processors and memories, optionally including multiple distributed processing systems. Parameters, databases, and other data structures may be separately stored and managed, may be incorporated into a single memory or database, may be logically and physically organized in many different ways, and may implemented with different types of data structures such as linked lists, hash tables, or implicit storage mechanisms. Logic, such as programs or circuitry, may be combined or split among multiple programs, distributed across several memories and processors, and may be implemented in a library, such as a shared library (e.g., a dynamic link library (DLL)). The DLL, for example, may store code that prepares intermediate mappings or implements a search on the mappings. As another example, the DLL may itself provide all or some of the functionality of the system, tool, or both.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. An extended collaboration event monitoring system, comprising:
  a computer processor; and
  a memory in communication with the computer processor, the memory comprising:
    instructions that, when executed, cause the computer processor to:
      extend a computer software application to embed a collaboration interface into an interface generated by the computer software application;
      monitor a user's interactions with the computer software application;
      identify an event based on the user's interactions with the computer software application;
      generate event data associated with the event, the event data comprising a structure that identifies a type of action taken by a user, a user that has performed the event, a document associated with the event and a project associated with the event;
      infer, using an inference engine executed by the computer processor and based on the event data associated with the event, a set of related events from one or more semantic models comprising additional events related to the event by a set of semantic relationships;
      wherein inferring the set of related events comprises analyzing, using the inference engine, structured, semantic representation of the event to infer the set of related events;
      wherein the set of related events includes a stream of events associated with the event and includes an event that was not detected by the event, an event implied by the event, events that are enabled or triggered as a result of the event, or a combination thereof;
      wherein the semantic models comprise people models, domain specific models, process and plan models, and work product models;
      infer, using the inference engine and based on the event data associated with the event, event data associated with the related events from the one or more semantic models;
    provide the event data to a social networking system;
    obtain from the social networking system the event data translated into human-readable form; and
    publish the event data associated with the event and the event data associated with the related events to the collaboration interface embedded into the interface generated by the computer software application, wherein the event data published to the collaboration interface includes the translated event data.

2. The extended collaboration event monitoring system of claim 1, wherein the instructions, when executed further cause the computer processor to:
  obtain from the social networking system event data associated with a second user's interactions with a second computer software application;
  publish the event data associated with the second user's interactions with the second computer software application to the collaboration interface.

3. The extended collaboration event monitoring system of claim 1, wherein identifying the event comprises comparing the user's interactions to a project plan template that defines a project plan.

4. The extended collaboration event monitoring system of claim 1, wherein the analyzed user's interactions with the computer software application comprise revisions by the user to a document, and wherein identifying an event comprises:
  analyzing the user's revisions to the document;
  determining whether the user's revisions mentions at least one key word in a set of key words stored in a project plan template;
  based on determining that the user's revisions mentions at least one key word in the set of key words, identifying each mention of the at least one key word as an event.

5. The extended collaboration event monitoring system of claim 1, wherein identifying an event comprises comparing the user's actions with predetermined heuristic data and determining, based on the comparison, whether the user's interactions correspond to an event.

6. The extended collaboration event monitoring system of claim 5, wherein the analyzed user's interactions with the computer software application comprise revisions by the user to a document, and wherein identifying an event further comprises:
  analyzing the user's revisions to the document;
  determine, based on the user's revisions, whether the document is complete or if a section of the document is complete;
  based on determining that the document is complete, identifying the document completion as an event; and based on determining that a section of the document is complete, identifying the section completion as an event.

7. The extended collaboration event monitoring system of claim 1, wherein identifying an event comprises:

applying a natural language parser to text entered by the user to generate a parse tree or syntactic representation of the text;

mapping the parse tree or syntactic representation to corresponding semantic relationships a model;

determining, based on the mapping, whether the user's interactions correspond to an event.

8. The extended collaboration event monitoring system of claim 1, further comprising a second computer processor in communication with the computer processor, the second computer processor configured to:

determine whether the event triggers an action item to-be-performed;

based on determining that the event triggers an action item to-be-performed:

generate action item data associated with the action item;

provide the action item event data to the social networking system;

obtain translated action item event data from the social networking system; and provide the translated action item event data to the computer processor, wherein the instructions, when executed, further cause the computer processor to publish the translated action item event data to the collaboration interface.

9. A collaboration event monitoring method, comprising:

extending a computer software application to embed a collaboration interface into an interface generated by the computer software application and rendered on a display device;

monitoring a user's interactions with a document within the computer software application;

identifying an event based on the user's interactions with the document;

generating, using a computer processor, event data associated with the event, wherein the event data comprises a structure that identifies a type of action taken by a user, a user that has performed the event, a document associated with the event and a project associated with the event;

publishing the event data to the collaboration interface embedded into the interface generated by the computer software application;

identifying a set of related events implied by the event comprising:

inferring, using an inference engine and based on the event data associated with the event, the set of related events from one or more semantic models comprising events related to the event by a set of semantic relationships; and wherein inferring the set of related events comprises analyzing, using the inference engine, structured, semantic representation of the event to infer the set of related events;

wherein the set of related events includes a stream of events associated with the event and includes an event that was not detected by the event, an event implied by the event, events that are enabled or triggered as a result of the event, or a combination thereof;

wherein the semantic models comprise people models, domain specific models, process and plan models, and work product models;

inferring, using the inference engine and based on the event data associated with the event, event data associated with the related events from the one or more semantic models;

generating event data associated with the related events; and provide the event data to a social networking system; and obtain from the social networking system the event data translated into human-readable form; and publishing the event data associated with the event and the event data associated with the related events to the collaboration interface embedded into the interface generated by the computer software application, wherein the event data published to the collaboration interface includes the translated event data.

10. The method of claim 9, wherein the analyzed user's interactions with a document within the computer software application comprise revisions by the user to the document, and wherein identifying an event comprises:

analyzing the user's revisions to the document;

determining whether the user's revisions mentions at least one key word in a set of key words stored in a project plan template;

based on determining that the user's revisions mentions at least one key word in the set of key words, identifying each mention of the at least one key word as an event.

11. The method of claim 9, wherein identifying an event comprises comparing the user's actions with predetermined heuristic data and determining, based on the comparison, whether the user's interactions correspond to an event.

12. The method of claim 11, wherein the analyzed user's interactions with a document within the computer software application comprise revisions by the user to the document, and wherein identifying an event further comprises:

analyzing the user's revisions to the document;

determine, based on the user's revisions, whether the document is complete or if a section of the document is complete;

based on determining that the document is complete, identifying the document completion as an event; and based on determining that a section of the document is complete, identifying the section completion as an event.

13. The method of claim 9, wherein identifying an event comprises:

applying a natural language parser to text entered by the user to generate a parse tree or syntactic representation of the text;

mapping the parse tree or syntactic representation to corresponding semantic relationships a model;

determining, based on the mapping, whether the user's interactions correspond to an event.

14. A product, comprising:

a computer-readable medium comprising instructions that, when executed, cause a computer processor to:

identify a first event based on a first user's interactions with a first computer software application;

identify a second event based on a second user's interactions with a second computer software application obtain first event data associated with the first event and second event data associated with the second event, wherein each event data comprises a structure that identifies a type of action taken by a user, a user that has performed the event, a document associated with the event and a project associated with the event;

infer, and based on the first event data, a set of related events from one or more semantic models comprising additional events related to the first event by a set of semantic relationships, wherein inferring the set of related event comprises analyzing, using the inference engine, structured, semantic representation of the event to infer the set of related events;

wherein the set of related events includes a stream of events associated with the event and includes an event that was not detected by the event, an event implied by the event, events that are enabled or triggered as a result of the event, or a combination thereof;

wherein the semantic models comprise people models, domain specific models, process and plan models, and work product models; and infer event data associated with the related events from the one or more semantic models;

provide the first and the second event data, and the event data associated with the related events, to a social networking system; and obtain from the social networking system the first and the second event data, and the event data associated with the related events, translated into human-readable form;

publish the translated first and the second event data, and the translated event data associated with the related events to a first collaboration interface that is embedded into an interface generated by the first computer software application and to a second collaboration interface that is embedded into an interface generated by the second computer software application.

15. The product of claim 14, wherein the instructions, when executed further cause the computer processor to:

obtain from the social networking system event data associated with a third user's interactions with a third computer software application;

publish the event data associated with the third user's interactions with the third computer software application to first collaboration interface, to the second collaboration interface, and to a third collaboration interface embedded into an interface generated by the third computer software application.

16. The product of claim 14, wherein identifying the event comprises comparing the user's interactions to a project plan template that defines a project plan.

17. The product of claim 14, wherein identifying the first event comprises:

analyze the first user's revisions to a document;

determine whether the first user's revisions mentions at least one key word in a set of key words stored in a project plan template;

based on determining that the first user's revisions mentions at least one key word in the set of key words, identifying a mention of the at least one key word as the first event.

18. The product of claim 14, wherein the first and the second user are part of a collaboration group comprising multiple users.

19. The product of claim 14, wherein identifying the first event comprises comparing the user's actions with predetermined heuristic data and determining, based on the comparison, whether the user's interactions correspond to an event.

20. The product of claim 19, wherein identifying the first event further comprises:

analyzing the user's revisions to a document;

determine, based on the user's revisions, whether the document is complete or if a section of the document is complete;

based on determining that the document is complete, identifying the document completion as an event; and based on determining that a section of the document is complete, identifying the section completion as an event.

21. The product of claim 14, wherein identifying the first event comprises:

applying a natural language parser to text entered by the user to generate a parse tree or syntactic representation of the text;

mapping the parse tree or syntactic representation to corresponding semantic relationships a model;

determining, based on the mapping, whether the user's interactions correspond to an event.

22. The system of claim 1, wherein the instructions, when executed, further cause the computer processor to:

create a new event not comprised by the one or more semantic models; and add the new event to the one or more semantic models.

23. An extended collaboration event monitoring system, comprising:

a computer processor; and a memory in communication with the computer processor, the memory comprising:

instructions that, when executed, cause the computer processor to:

extend a computer software application to embed a collaboration interface into an interface generated by the computer software application;

monitor a user's revisions of a document within the computer software application;

identify an event based on the user's revisions of the document;

generate event data associated with the event, wherein the event data comprises a structure that identifies a type of action taken by a user, a user that has performed the event, a document associated with the event and a project associated with the event;

infer, using an inference engine executed by the computer processor and based on the event data associated with the event, a set of related events from one or more semantic models comprising additional events related to the event by a set of semantic relationships, wherein inferring the set of related event comprises analyzing, using the inference engine, structured, semantic representation of the event to infer the set of related events;

wherein the set of related events includes a stream of events associated with the event and includes an event that was not detected by the event, an event implied by the event, events that are enabled or triggered as a result of the event, or a combination thereof;

wherein the semantic models comprise people models, domain specific models, process and plan models, and work product models;

infer, using the inference engine and based on the event data associated with the event, event data associated with the related events from the one or more semantic models;

provide the event data to a social networking system;

obtain from the social networking system the event data translated into human-readable form; and publish the event data associated with the event and the event data associated with the related events to the collaboration interface embedded into the interface generated by the computer software application, wherein the event data published to the collaboration interface includes the translated event data.

* * * * *